(12) United States Patent
Hansen (10) Patent No.: US 12,551,645 B2
(45) Date of Patent: Feb. 17, 2026

(54) INTUBATION ASSEMBLY (71) Applicant: Bryant C. Hansen, Ferndale, MI (US)

(72) Inventor: Bryant C. Hansen, Ferndale, MI (US)

( * ) Notice: Subject to any disclaimer, the term of this patent is extended or adjusted under 35 U.S.C. 154(b) by 0 days.

(21) Appl. No.: 18/965,606

(22) Filed: Dec. 2, 2024

(65) Prior Publication Data

US 2025/0332365 A1 Oct. 30, 2025

Related U.S. Application Data (60) Provisional application No. 63/640,635, filed on Apr. 30, 2024.

(51) Int. Cl.
*A61M 16/04* (2006.01)

(52) U.S. Cl.
CPC .... *A61M 16/0463* (2013.01); *A61M 16/0434* (2013.01)

(58) Field of Classification Search
CPC .............. A61M 16/04; A61M 16/0402; A61M 16/0434; A61M 16/0463; A61M 16/0486; A61M 2039/0009; A61M 2039/1072; A61M 2039/1077
See application file for complete search history.

(56) References Cited

U.S. PATENT DOCUMENTS

| | | | |
|---|---|---|---|
| 4,699,138 A * | 10/1987 | Behrstock | A61M 16/0418 604/902 |
| 5,000,175 A * | 3/1991 | Pue | A61M 16/0418 128/207.14 |
| 5,669,380 A | 9/1997 | Garry et al. | |
| 6,086,559 A | 7/2000 | Enk | |
| 6,485,428 B1 | 11/2002 | Enk | |
| 7,204,248 B2 | 4/2007 | Enk | |
| 8,950,400 B2 | 2/2015 | Enk | |
| 9,162,033 B2 | 10/2015 | Enk | |
| 9,539,401 B2 | 1/2017 | Tatkov | |
| 9,700,693 B2 | 7/2017 | Qiu | |
| 10,118,007 B2 | 11/2018 | Enk | |
| 10,406,308 B2 | 9/2019 | Enk | |
| 10,543,335 B2 | 1/2020 | Enk | |
| 10,857,318 B2 | 12/2020 | Enk et al. | |
| 10,960,166 B2 | 3/2021 | Enk | |
| 11,642,480 B2 | 5/2023 | Enk et al. | |
| 11,969,550 B2 | 4/2024 | Enk et al. | |

(Continued)

FOREIGN PATENT DOCUMENTS

| CA | 3016247 A1 | 9/2017 |
|---|---|---|
| DE | 19963740 A1 | 7/2001 |

(Continued)

OTHER PUBLICATIONS

Carullo, P. et al., "Esophocclude: Providing Temporary Esophageal Occlusion for Emergency Surgery", University of Pittsburgh Innovation Institute, ID: 3742, Sep. 2017, pp. 1-2.

(Continued)

*Primary Examiner* — Joseph D. Boecker
(74) *Attorney, Agent, or Firm* — Warner Norcross + Judd LLP (57) ABSTRACT

An intubation assembly operable as both a tracheal tube and a suction catheter. The intubation assembly may include an adapter operable to couple to a suction hose, and the adapter may be removably coupled to the tracheal tube.

10 Claims, 8 Drawing Sheets

(56) References Cited

U.S. PATENT DOCUMENTS

| | | | |
|---|---|---|---|
| 2008/0185006 A1* | 8/2008 | Harand | A61M 16/20 128/207.14 |
| 2014/0194688 A1* | 7/2014 | Ho | A61B 1/2676 600/114 |
| 2015/0151063 A1* | 6/2015 | Hoftman | A61B 1/05 128/200.26 |
| 2016/0256646 A1* | 9/2016 | Vazales | A61M 13/003 |
| 2019/0022342 A1 | 1/2019 | Enk | |
| 2020/0054852 A1* | 2/2020 | Soares | A61M 16/0434 |
| 2023/0043873 A1 | 2/2023 | Enk et al. | |
| 2023/0201502 A1 | 6/2023 | Enk et al. | |
| 2023/0248929 A1 | 8/2023 | Enk et al. | |
| 2025/0082192 A1* | 3/2025 | Salasidis | A61B 1/00082 |

FOREIGN PATENT DOCUMENTS

| | | |
|---|---|---|
| DE | 20213420 U1 | 11/2002 |
| DE | 102009029959 A1 | 12/2010 |
| WO | 2008113752 A2 | 9/2008 |
| WO | 2015004229 A1 | 1/2015 |

OTHER PUBLICATIONS

International Search Report and the Written Opinion of the International Searching Authority for International Application No. PCT/US2025/026812 mailed May 29, 2025, pp. 1-9.

Ventinova Medical, "Manual Ventilator Ventrain", available at https://www.ventinovamedical.com/en/products/ventrain at least as of Nov. 15, 2025, pp. 1-6.

* cited by examiner

INTUBATION ASSEMBLY

FIELD OF INVENTION

The present disclosure relates to an intubation assembly, and more particularly to an intubation assembly operable as both a tracheal tube and a suction catheter.

BACKGROUND

Emergency intubation is considered to be a high-risk, time-sensitive procedure. A medical professional may determine such a procedure is necessary in an effort to prevent death and severe disability. In such cases, patients are often in or near cardiac arrest and may be at high risk for hemorrhage, vomiting, and aspiration necessitating rescue devices and time-critical actions. Other patients in whom this risk may also be seen are pregnant patients, gastrointestinal bleeding, trauma, and prolonged seizure. During the emergency intubation procedure, in some instances, emesis and hemorrhage can obscure visualization of the trachea and cause aspiration.

SUMMARY

In general, one innovative aspect of the subject matter described herein can be embodied in an intubation assembly that includes a tracheal tube operable for insertion into a trachea of a patient. The tracheal tube may include a proximal end and a distal end, where the distal end is insertable into the trachea of the patient, and where the proximal end may include a connector operable to couple to an air mover. The intubation assembly may include a suction port operable to couple to a suction hose. The suction port may be fluidly coupled to the distal end of the tracheal tube for removal of material from a region of the patient at or near to the distal end of the tracheal tube through the tracheal tube and the suction hose coupled to the suction port.

The foregoing and other embodiments can each optionally include one or more of the following features, alone or in combination. In particular, one embodiment includes all the following features in combination.

In some embodiments, the intubation assembly may include a tube adapter operable to removably couple to the connector of the tracheal tube. The tube adapter may include the suction port, a first opening operable to couple to the connector of the tracheal tube, and a second opening operable to receive a guide.

In some embodiments, the guide may be a malleable stylet or a rigid stylet.

In some embodiments, the tube adapter may include a cap provided on the second opening. The cap may include a guide opening through which the guide is positionable.

In some embodiments, removal of the cap from the second opening both substantially ceases suction from the distal end to the suction port and at least partially removes the guide from the tracheal tube.

In some embodiments, the guide may be moveable though the guide opening.

In some embodiments, the guide may be absent from the intubation assembly, and where, without the guide, the intubation assembly is configured to remove material from the region of the patient through the suction port.

In some embodiments, the tube adapter may be removable from the connector of the tracheal tube.

In some embodiments, suction from the distal end of the tracheal tube through the suction port may be controllable by selectively blocking the second opening of the tube adapter.

In some embodiments, the tracheal tube may include an inflatable cuff.

In general, one innovative aspect of the subject matter described herein can be embodied in a tube adapter for an intubation assembly. The intubation assembly may include a tracheal tube operable for insertion into a trachea of a patient. The tracheal tube may include a proximal end and a distal end. The distal end may be insertable into the trachea of the patient, and the proximal end may include a connector operable to couple to an air mover. The tube adapter may include a suction port operable to couple to a suction hose, where the suction port may be fluidly coupled to the proximal end of the tracheal tube for removal of material from a region of the patient at or near to the distal end of the tracheal tube through the tracheal tube and the suction hose coupled to the suction port. The tube adapter may include a first opening operable to couple to the proximal end of the tracheal tube, and the tube adapter may include a second opening operable to receive a guide.

The foregoing and other embodiments can each optionally include one or more of the following features, alone or in combination. In particular, one embodiment includes all the following features in combination.

In some embodiments, the tube adapter may include a cap provided on the second opening. The cap may include a guide opening through which the guide is positionable.

In some embodiments, removal of the cap from the second opening both substantially ceases suction from the distal end to the suction port and at least partially removes the guide from the tracheal tube.

In some embodiments, the guide may be moveable though the guide opening of the cap.

In some embodiments, the tube adapter may be removable from the proximal end of the tracheal tube.

In some embodiments, suction from the distal end of the tracheal tube through the suction port may be controllable by selectively blocking the second opening of the tube adapter.

In general, one innovative aspect of the subject matter described herein can be embodied in a kit for performing intubation of a patient. The kit may include a tracheal tube operable for insertion into a trachea of the patient. The tracheal tube may include a proximal end and a distal end, where the distal end may be insertable into the trachea of the patient, and where the proximal end may include a connector operable to couple to an air mover. The kit may include a tube adapter with a suction port operable to couple to a suction hose. The suction port may be fluidly coupled to the proximal end of the tracheal tube for removal of material from a region of the patient at or near to the distal end of the tracheal tube through the tracheal tube and the suction hose coupled to the suction port. The tube adapter may include a first opening operable to couple to the proximal end of the tracheal tube, and the tube adapter may include a second opening operable to receive a guide.

The foregoing and other embodiments can each optionally include one or more of the following features, alone or in combination. In particular, one embodiment includes all the following features in combination.

In some embodiments, the tube adapter may include a cap provided on the second opening, and the cap may include a guide opening through which the guide is positionable.

In some embodiments, removal of the cap from the second opening both substantially ceases suction from the distal end to the suction port and at least partially removes the guide from the tracheal tube.

In some embodiments, the guide may be moveable though the guide opening of the cap.

In some embodiments, the tube adapter may be removable from the connector of the tracheal tube.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

An intubation assembly according to one embodiment is provided to facilitate intubation of a patient and is generally designated 100. The intubation assembly 100 may take the form of a kit provided to a caregiver (e.g., a medical doctor or proceduralist or other type of medical professional) for use with intubating the patient. The intubation assembly 100 may be operable as both a tracheal tube (e.g., an endotracheal tube) and a suction catheter. The intubation assembly 100 in one embodiment may be used to convert a conventional tracheal tube into a swiss-army-knife-like device that empowers a proceduralist or caregiver an ability to immediately perform corrective actions to enable intubation.

In one embodiment, the intubation assembly 100 may include an adapter 20 (e.g., a tube adaptor or device) that can be a small, lightweight, hard-plastic piece that fits universally on a proximal end 12 of an tracheal tube 10 by connecting to a connector 13, which provides a proximal, removable, universal adapter for coupling the tracheal tube 10 to an air mover, such as a ventilator.

In one embodiment, the adapter 20 may include an in-line male and a female adapter similarly sized to the connector 13 of the tracheal tube 10. The adapter 20 may include a side-mounted suction port 26 (e.g., a suction hose adapter). The side-mounted suction port 26 may be provided in a manner that shapes the adapter 20 in the form of a "λ" symbol. A cap 28 may be provided in one embodiment, in the form of a small soft-plastic cover with centerline x-shaped flaps. The cap 28 may fit overtop or close a second opening 24 of the adapter 20. The material of the cap 28 may vary from application to application and is not limited to a soft plastic. For example, the cap 28 may be made of rubber or another material other than plastic.

In one embodiment, the cap 28 may be attached to the adapter 20 via a threaded connection or another type of connection. The stylet 30 may be built in or separable from the cap 28.

In one embodiment, the x-shaped flaps of the cap 28 may provide a guide opening 29 through which a stylet 30 can be passed through into the tracheal tube 10 and occludes the guide opening 29 to prevent significant air flow through the guide opening 29, allow suctioning (with or without the stylet in place) as described herein. It is to be understood that the guide opening 29 in the cap 28 is not limited to the x-shaped flap configuration depicted in the illustrated embodiment, and that any type of configuration may be provided that facilitates allowing passage of the stylet 30 and occluding significant air flow through the guide opening 29 with or without presence of the stylet 30.

In one embodiment, the adapter 20 may enable the tracheal tube 10 to be used as a suction catheter in a manner similar to conventional suction-only catheters on the market, such as the Yankour, DuCanto, and Hi-D catheters. If emesis, hemorrhage, or significant oral secretions either block the caregiver's view or pose significant risk of aspiration, the intubation assembly 100 being operated as a suction catheter may be operated to provide a high-rate of suction, even with the stylet 40 in place, potentially allowing intubation to occur at any moment the caregiver sees the vocal cords. As the adapter 20 fits to the connector 13 (e.g., a proximal adapter) of the tracheal tube 10, which is often a universal connector, the adapter 20 may be configured to function with any tube type and size and for patients of all ages.

An intubation assembly 100 according to one embodiment may enable intubation to occur without the need for "bougie-exchange", thereby reducing steps, time, and amount of material that becomes aspirated as it is only the balloon of the tracheal tube 10 that stops aspiration into the lungs. Further, if a "blind throw" of the tracheal tube 10 is necessitated due to massive fluid volume, the intubation assembly 100 can be left in the esophagus where, once the stylet 30 is removed, it has a higher diameter and thus higher flow rate (for all tracheal tubes 10 greater than 6.5 mm). If the rate of emesis or hemorrhage still outpaces the suction rate, the balloon of the tracheal tube 10 can be inflated to fully occlude the esophagus, thereby prohibiting any fluid from entering the oropharynx. In this scenario, a bougie or backup tracheal tube 10 may be placed into the trachea for subsequent tracheal intubation.

Figure 1:
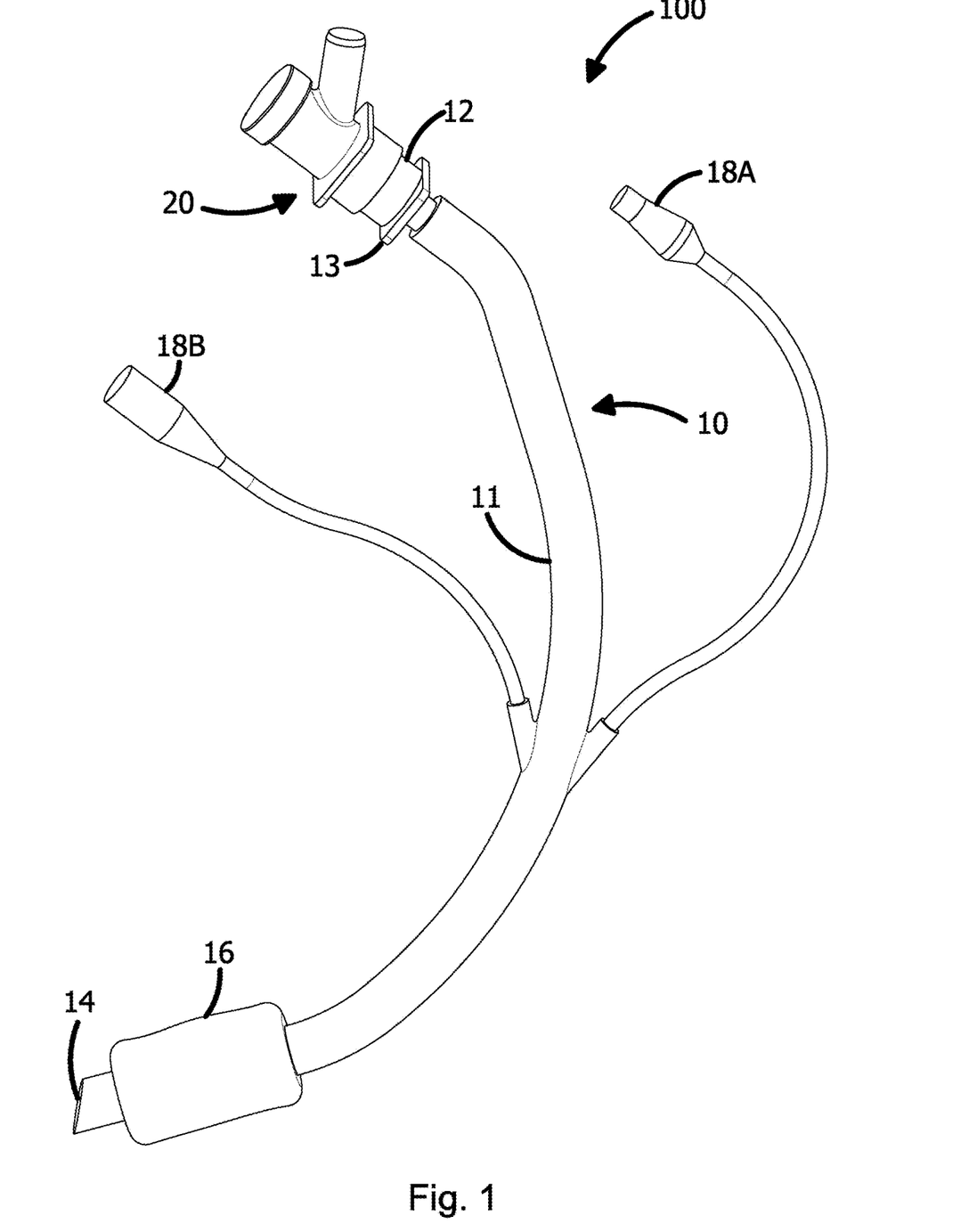
FIG. 1 shows an intubation assembly according to one embodiment.
Figure 2:
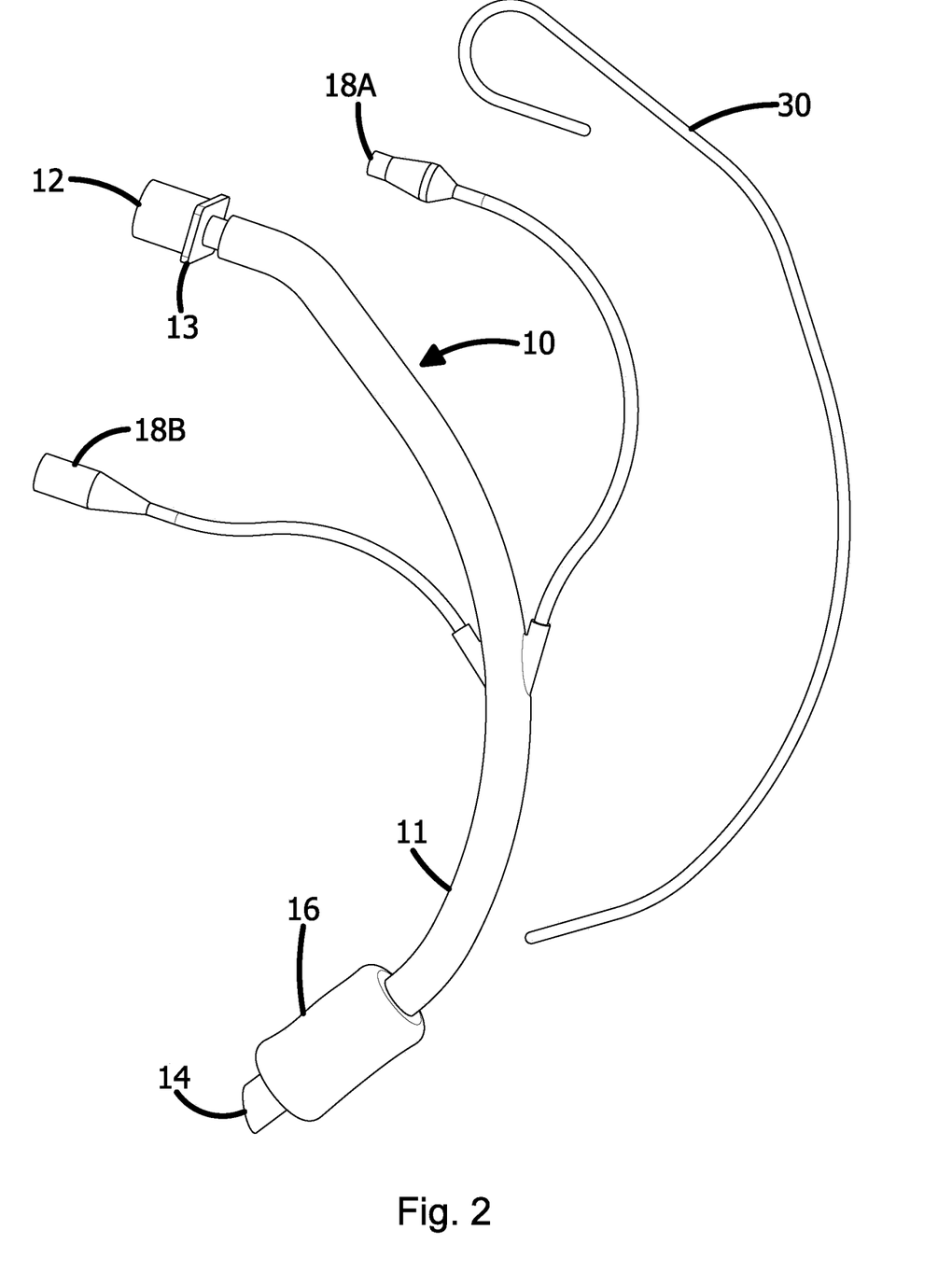
FIG. 2 shows a tracheal tube according to one embodiment.

In the illustrated embodiment of FIGS. 1 and 2, the intubation assembly 100 includes a tracheal tube 10 with a proximal end 12 and a distal end 14. The tracheal tube 10 includes a main tube 11 with a first end that defines the distal end 14 and a second end opposite the first end 14 on which a connector 13 is disposed. The connector 13 may define the proximal end 12 of the tracheal tube 10. It is noted that tracheal tube 10 may be provided in various lengths and diameters, depending on the application (e.g., the patient's age). In one embodiment, the connector 13 may be sized to connect to the second end of the main tube 11 and to optionally provide a proximal end 12 that is a standard size for connecting to an air mover (e.g., a ventilator).

In the illustrated embodiment, the main tube 11 is polyvinyl chloride (PVC). However, the present disclosure is not so limited and the main tube 11 may be formed of any type of material or materials.

The tracheal tube 10 may include one or more accessory tubes 18A-B configured to facilitate operation of the cuff 16 as well as an extra subglottic suction port. The tracheal tube 10 may or may not include a subglottic suction port 18A for which suction may be provided by itself or simultaneously with the distal end 14 of the tracheal tube 10. Suction to the subglottic suction port 18A may be provided by the suction tube 40 or a second suction tube that may be similar to suction tube 40. A cuff inflation port 18B may be provided on a tracheal tube 10 in one embodiment. The cuff inflation port 18B may be used to inflate the cuff 16, if the tracheal tube 10 includes the cuff 16, which may be used to help secure the tracheal tube 10 in the trachea and may help to prevent aspiration of fluid and material into the lungs. The cuff inflation port 18B may also be used in some embodiments to be inflated in the esophagus to help prevent fluid and material from moving up into the oropharynx and trachea, which may otherwise cause aspiration or obscure the view of the trachea by the proceduralist. In one embodiment, the adapter 20 may also be used with a tracheal tube 10 that does not have a cuff 16 or a cuff inflation tube 18B.

The intubation assembly 100 may include a stylet 30 (e.g., a guide) operable to help insertion of the distal end 14 into the trachea of the patient. The stylet 30 may be curved and semi-rigid or malleable to aid in shaping the tracheal tube 10 for insertion into the trachea. The stylet 30 is inserted into the tracheal tube 10 via the proximal end 12 but does not extend through the tracheal tube 10 beyond the distal end 14.

The tracheal tube 10 may include an inflatable cuff 16 operable to be inflated and form a seal against the inner surface of the trachea. This way, fluid intrusion past the inflatable cuff 16 can be prevented, and air can be forced under pressure into the trachea of the patient via the tracheal tube 10.

The intubation assembly 100 in the illustrated embodiment includes an adapter 20, which is described herein in further detail. The adapter 20 may facilitate use of the tracheal tube 10 for intubation and as a suction catheter.

Figure 3:
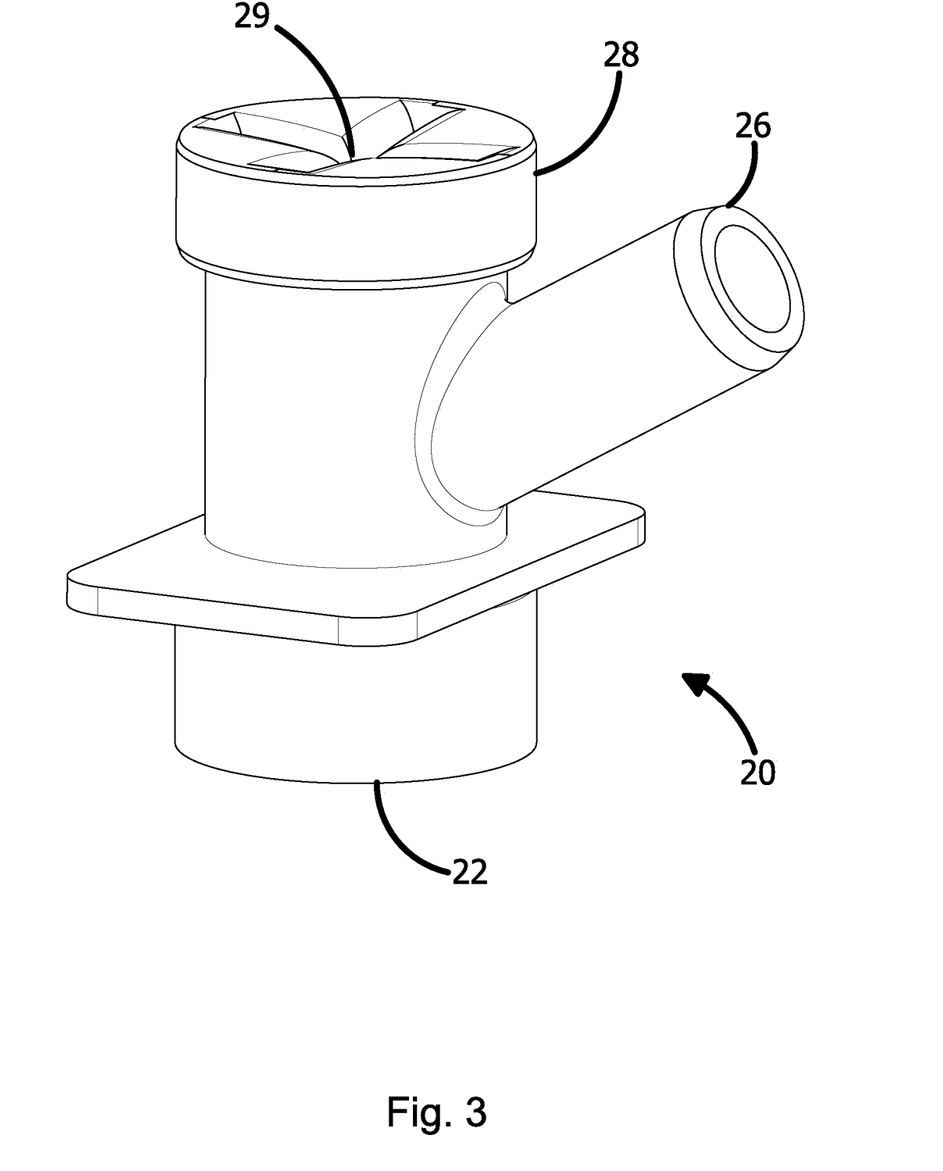
FIG. 3 shows a representative view of an adapter according to one embodiment.
Figure 4:
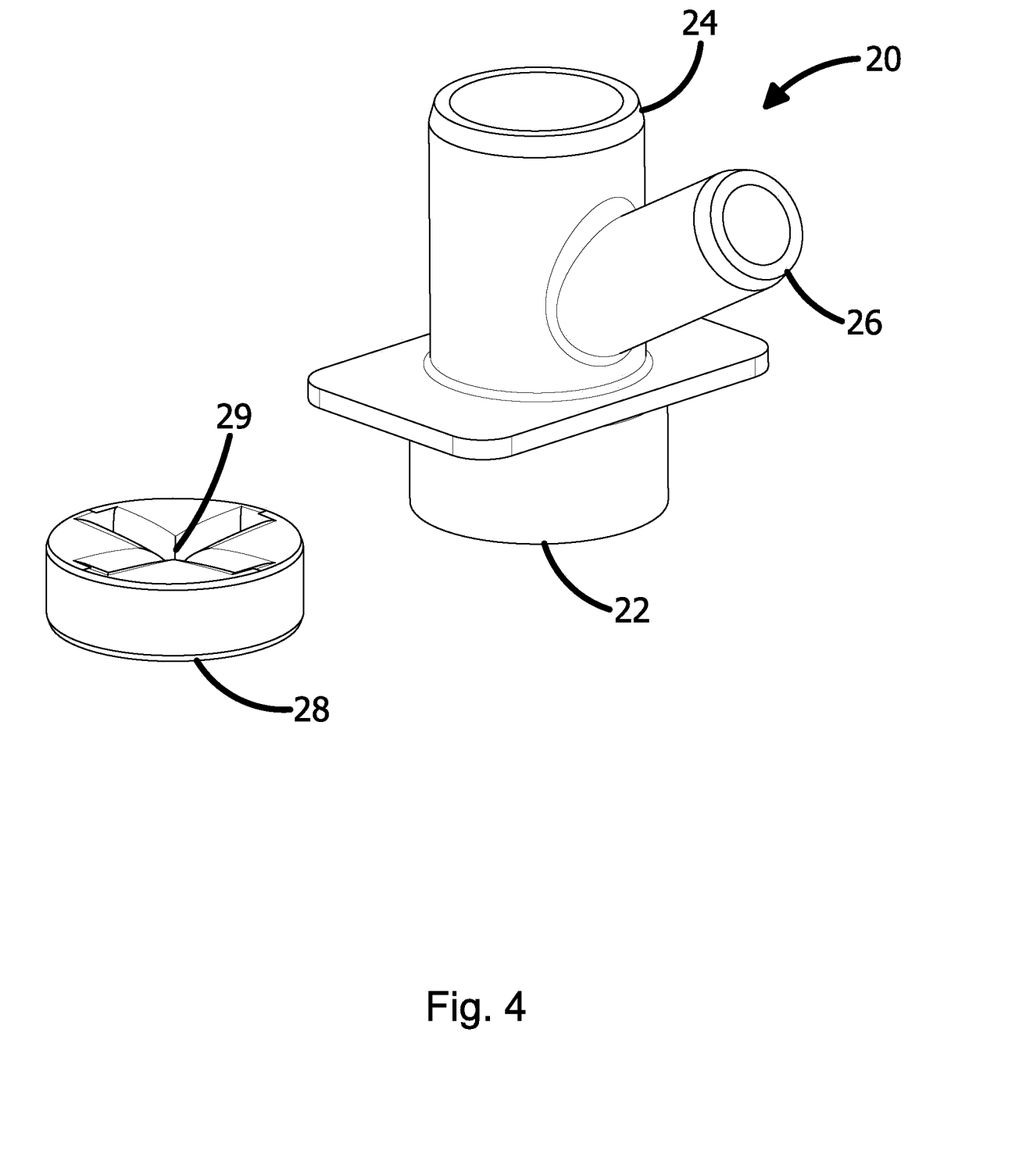
FIG. 4 shows an unassembled view of the adapter of FIG. 3.
Figure 5:
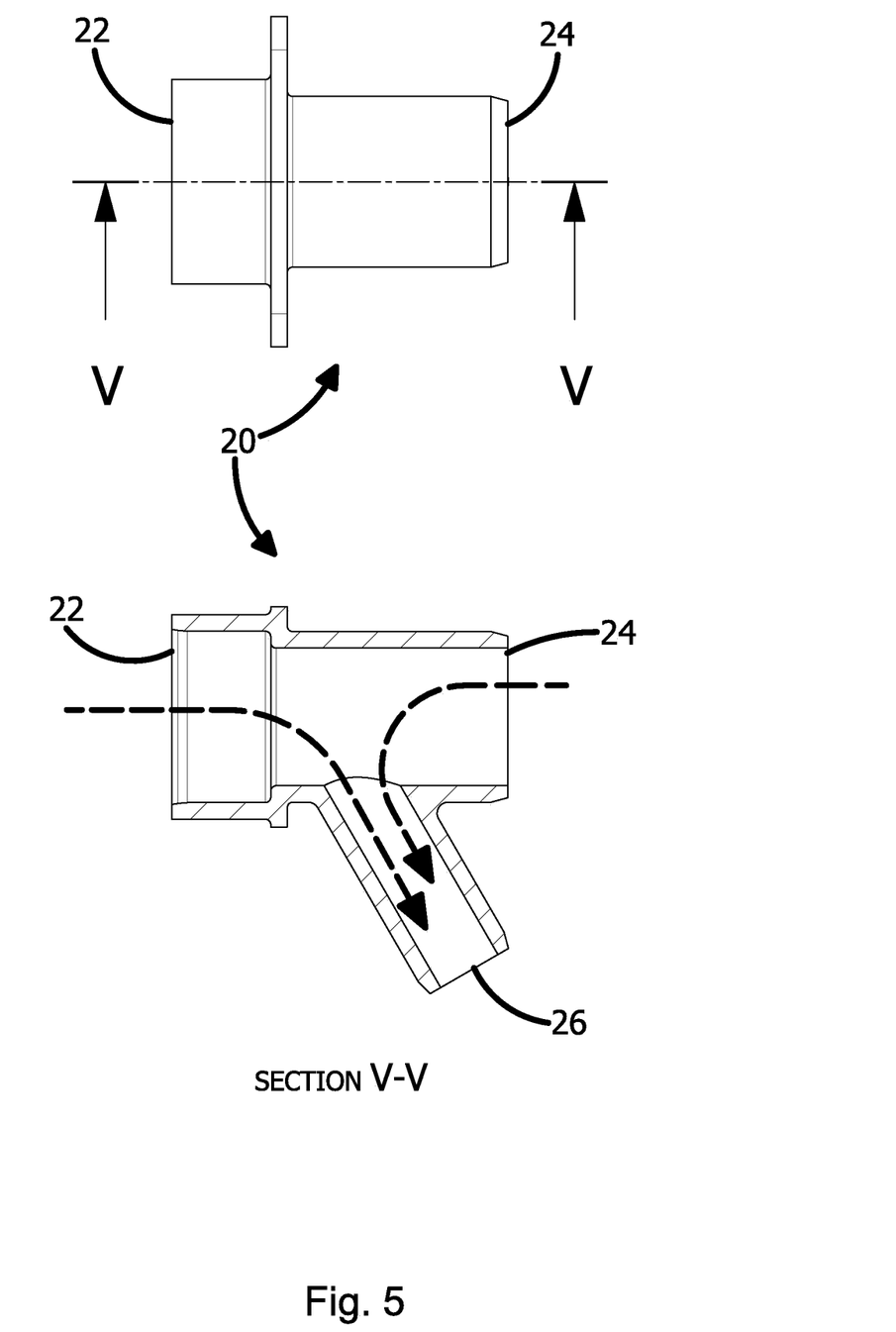
FIG. 5 shows a sectional view of the adapter of FIG. 3.

The adapter 20 is shown in further detail in the illustrated embodiment of FIGS. 3-5. The adapter 20 includes a first opening 22 and a second opening 24 in fluid communication with the first opening 22. The first opening 22, as described herein, may be sized to couple to the connector 13 of the tracheal tube 10 at the proximal end 12 thereof. A second opening 24 may be optionally sized similar to the connector 13 so that an air mover may be universally coupled to the adapter 20 in a manner similar the connector 13.

The adapter 20 may include a suction port 26, which may be a third opening in the adapter 20. The suction port 26 may be positioned and sized to fluidly couple to a suction hose 40, which may operably coupled to a pump operable to generate a vacuum to move fluid and material through the suction port 26. The suction port 26 may be fluidly coupled to both the first and second openings 22, 24 as depicted in FIG. 5. In an alternative embodiment, the suction hose 40 may be coupled to the second opening 24 of the adapter 20, in which case the second opening 24 operates as a suction port of the adapter 20. The stylet may or may not be present with the suction hose 40 coupled to the section opening 24.

The second opening 24 of the adapter 20, in one embodiment, may be occluded or blocked to prevent substantial flow of fluid (e.g., air) from the second opening 24 to the suction port 26. In this circumstance, the suction port 26, when subject to a vacuum via the suction hose 40, may facilitate removal of material via the first opening 22. For instance, the first opening 22 may be coupled to the connector 13 of the tracheal tube 10 so that the suction port 26 is fluidly coupled to the distal end 14 of the tracheal tube 10. A vacuum provided to the suction port 26 may facilitate removal of material from a region of the patient at or near the distal end 14 through tracheal tube 10, through the suction port, and into the suction hose 40.

In one embodiment, the second opening 24 may be selectively occluded so that removal of the occlusion or blockage of the second opening 24 may substantially discontinue removal of material via the distal end 14 of the tracheal tube 10 (with the suction port 26 under vacuum via the suction hose 40). In other words, with removal of the occlusion from the second opening 24, air may flow from the second opening 24 through the suction port 26 under vacuum. Such air flow between the second opening 24 and the suction port 26 may relieve the vacuum applied to the first opening 22 and substantially discontinue removal of material via the distal end 14.

Selective occlusion of the second opening 24 may be provided in a variety of ways, depending on the application. For instance, as described herein, a cap 28 may be provided on the second opening 24 to occlude fluid flow through the second opening 24, so that material can be removed from the distal end 14 via the first opening 22 of the adapter 20 under vacuum from the suction port 26. Alternatively, a caregiver may occlude the second opening 24 with a finger or other instrument to selectively remove material from the distal end 14.

The cap 28 for the second opening 24, in one embodiment, may include a guide opening 29 through which a stylet 30 may be positioned. The guide opening 29 may be configured to occlude fluid flow through the guide opening 29 in cases where the stylet 30 is present and where the stylet is absent. For instance, the guide opening 29 may be defined by flaps (e.g., provided by two slits in the form of an X-shape) or a single slit that facilitates receipt of the stylet 30 through the guide opening 29 while substantially occluding fluid flow therethrough regardless of whether the stylet 30 is present or absent. As another example, the guide opening 29 may be a hole sized similar in diameter to the stylet 30, and the hole may be occluded by a plug. In one embodiment, the stylet 30 may have a built-in cap that may take the place of the separate cap 28 described herein to fit over the second opening 24.

In an alternative embodiment, the cap 28 and the stylet 30 may be joined together so that the cap 28 is built onto the stylet 30. For instance, an end of the stylet 30 may be joined with the cap 28 (e.g., without passing through the cap 28). Optionally, the guide opening through the cap 28 may be absent in this configuration. As another example, the stylet 30 may pass through the cap 28 but may be joined with the cap 28 (e.g., via a friction fit and/or adhesive) so that the stylet 30 and the cap 28 do not move relative to each other.

In one embodiment, the adapter 20 includes a second opening 24 on which the occlusion cap 28 may be attached, a first opening 22 which may be used to attach the adapter onto the proximal end 12 of the tracheal tube 10, and a suction port 26 on which the suction hose 40 may be attached.

The occlusion cap 28 may go on the second opening 24 of the adapter 20 and has a guide opening 29 (e.g., a center slit [an x]) through which the stylet 30 may be passed. This configuration may provide occlusion to the intubation assembly 100 (e.g., the adapter-tracheal tube assembly) both with and without an inserted stylet 30 to enable suctioning to be delivered to the tracheal tube's open, distal end 14. The tracheal tube 10 in the illustrated embodiment of FIG. 1 may be a cuffed tracheal tube, which is the type of tube used in many intubation procedures. The cuff 16 may be an inflatable occlusion balloon just proximal to the distal end 14.

Figure 6:
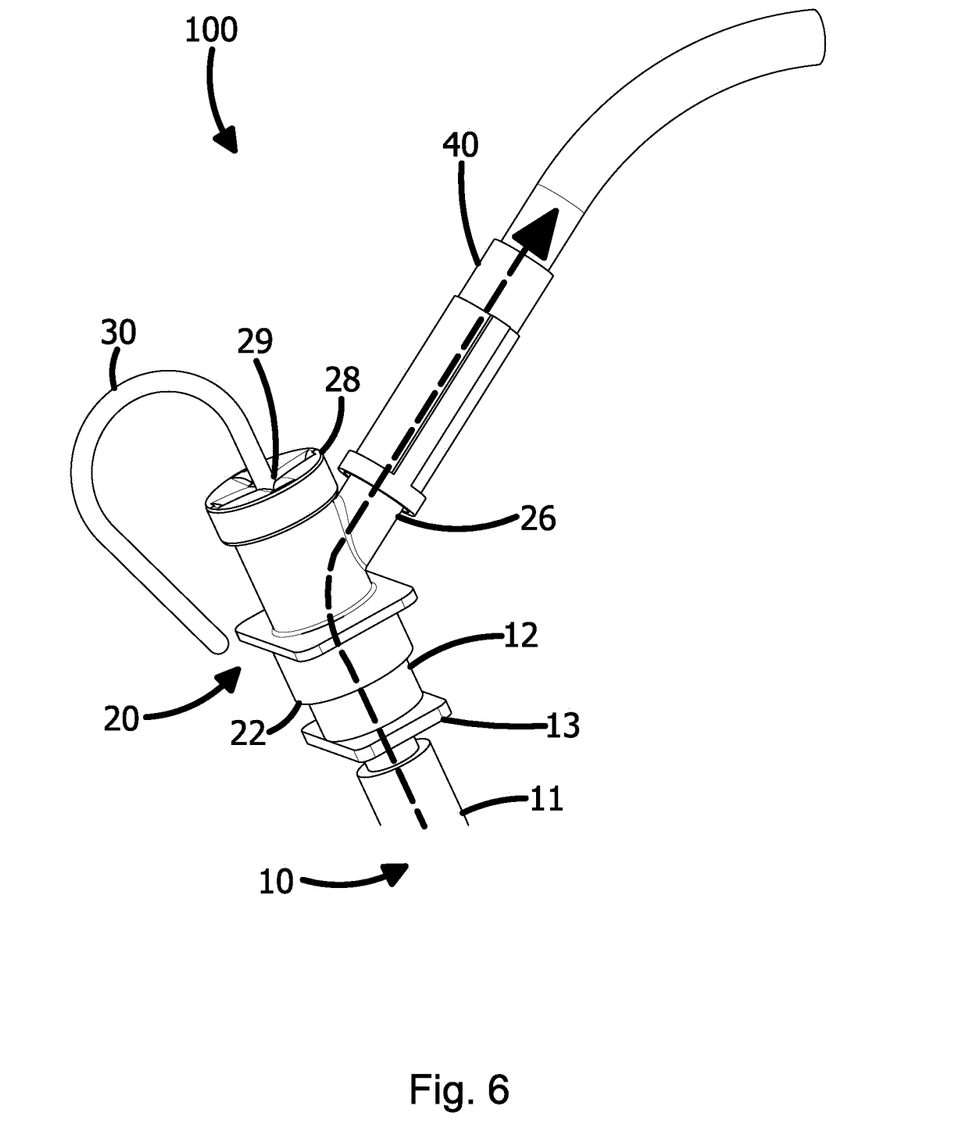
FIG. 6 shows an intubation assembly with a suction hose according to one embodiment.

Turning to the illustrated embodiment of FIG. 6, the intubation assembly 100 is shown coupled to a suction hose 40 for operation as a suction catheter. The stylet 30 has been inserted through the guide opening 29 of the cap 28. Under vacuum applied by the suction hose 40 to the suction port 26, fluid may flow through the tracheal tube 10 from a region of the patient proximal to the distal end 14, through the main tube 11, the connector 13, the second opening 22, and the suction port 26 into the suction hose 40.

In the illustrated embodiment of FIG. 6, the adapter 20 is shown affixed atop the universal adapter (e.g., connector 13) of the tracheal tube 10. The stylet 30 has been passed through the guide opening 29 (e.g., slits) of the occlusion cap 28 and into the tracheal tube 10. The suction hose 40 has been connected to the suction port 26. The intubation assembly 100 is considered ready to use in the illustrated embodiment. During the procedure, the operator can use the intubation assembly 100 as a suction wand in order to obtain visualization of the entrance to the patient's trachea by suctioning any obscuring oral secretions, vomit, or blood.

There are at least two methods in which the intubation assembly 100 can be deployed.

Figure 7:
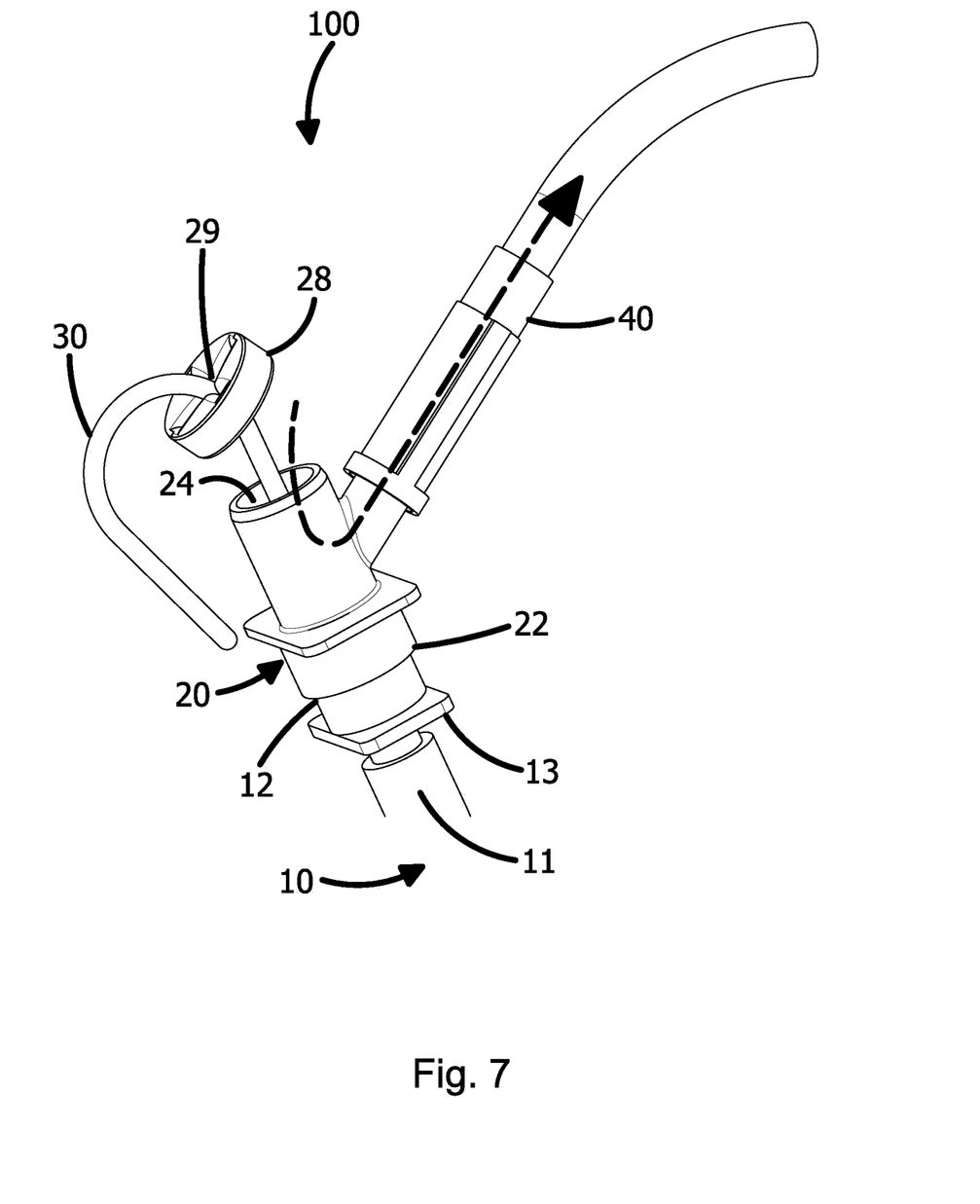
FIG. 7 shows the intubation assembly with the suction hose according to one embodiment.

In FIG. 7, the intubation assembly 100 is shown with the stylet 30 and the cap 28 having been removed from the second opening 24 of the adapter 20. As described herein, in this configuration, the second opening 24 is no longer occluded and therefore fluid may flow from the second opening 24 into the suction port 26 as shown. This fluid path between the second opening 24 and the suction port 26 may cause suction from the distal end 14 to the suction port 26 to decrease substantially.

Figure 8:
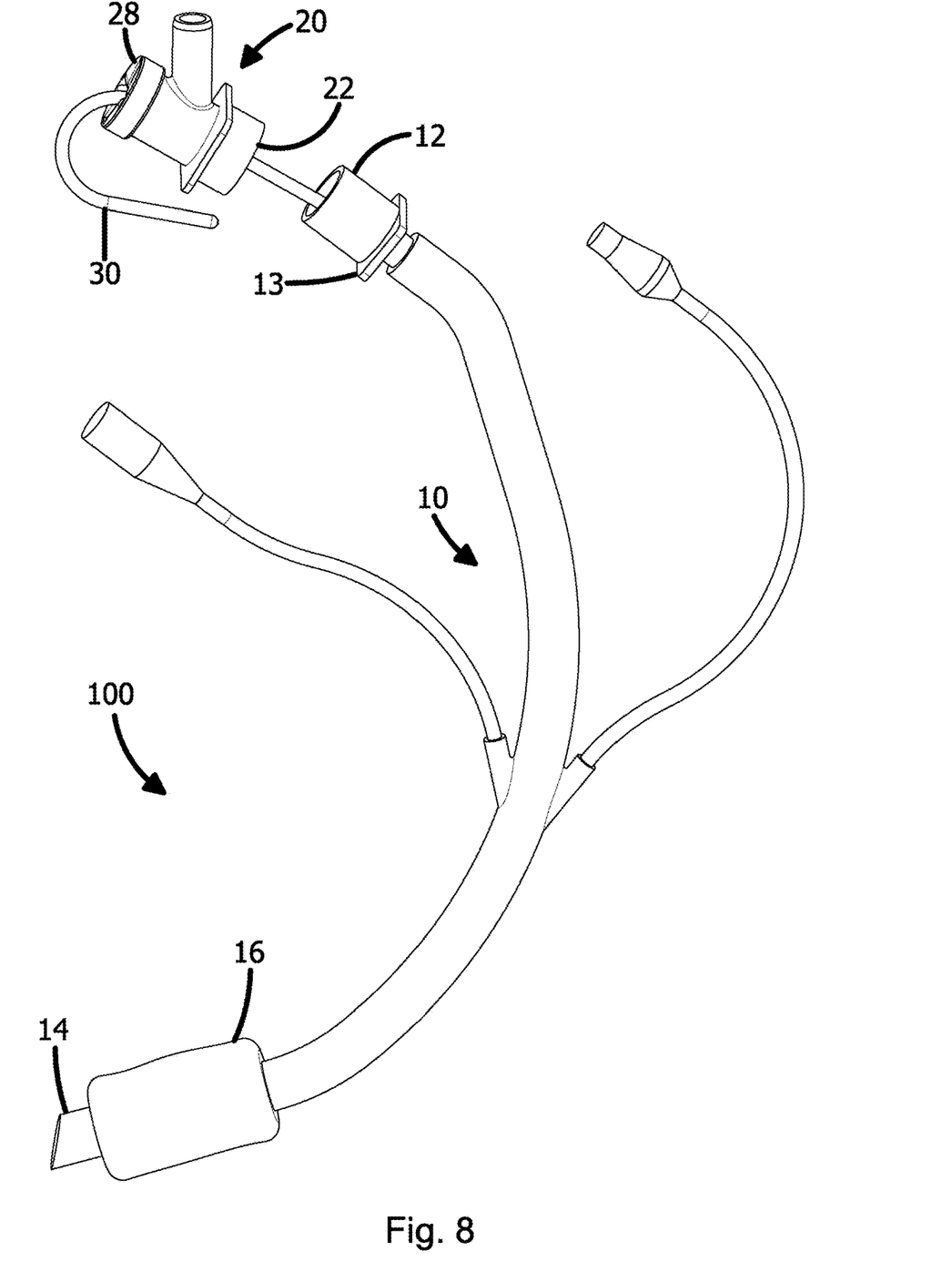
FIG. 8 shows the intubation assembly according to one embodiment.

The illustrated embodiment of FIG. 7 depicts the appearance of the intubation assembly 100 as if time were paused immediately after the operator or caregiver has started inserting the tracheal tube 10 into the trachea. The stylet 30 is shown in a partially withdrawn state. During normal intubation, an assistant or caregiver may pull out the stylet 30 in one motion after the operator or caregiver has placed the tip of the tube (e.g., the distal end 16) in the trachea, which allows the operator or caregiver to advance the tube to the desired distance in the trachea. The stylet 30 may curve the tracheal tube 10 into a shape to navigate through the mouth but would otherwise prevent the tracheal tube 10 from bending backwards to go down the trachea. The occlusion cap 28 may remain adhered or affixed to the stylet 30 as it is removed from the intubation assembly 100 as shown in FIG. 7, and thus pulling the stylet 30 may lift the cap 28 off the adapter 20 and thereby end occlusion and cease suction at the open distal end 14 of the tracheal tube 10. After the tracheal tube 10 is fully in the trachea, the adapter 20 may be removed from the tracheal tube 10 as shown in FIG. 8, allowing attachment of the ventilator or other air mover to the tracheal tube 10.

Alternatively, to cause substantial stoppage of suction from the distal end 14 to the suction port 26, the adapter 20 may be removed from the proximal end 12 of the tracheal tube 10 along with the stylet 30. This configuration can be seen in FIG. 8, and as described herein, after the adapter 20 has been removed from the tracheal tube 10, the ventilator or other type of air mover may be coupled to the tracheal tube 10.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. An intubation assembly comprising:
    a tracheal tube operable for insertion into a trachea of a patient, the tracheal tube including a proximal end and a distal end, the distal end being insertable into the trachea of the patient, the proximal end including a connector operable to couple to an air mover; and
    a tube adapter operable to removably couple to the connector of the tracheal tube, the tube adapter including:
        a suction port operable to couple to a suction hose, the suction port being fluidly coupled to the distal end of the tracheal tube for removal of material from a region of the patient at or near to the distal end of the tracheal tube through the tracheal tube and the suction hose coupled to the suction port;
        a first opening operable to couple to the connector of the tracheal tube;
        a second opening operable to receive a stylet; and a cap provided on the second opening, the cap including the styllet so that the cap is joined with the styllet.

2. The intubation assembly of claim 1, wherein removal of the cap from the second opening both A) provides a path for fluid flow that substantially prevents suction from the distal end to the suction port via application of a vacuum to the suction port and B) at least partially removes the styllet from the tracheal tube.

3. The intubation assembly of claim 1, wherein suction from the distal end of the tracheal tube through the suction port is controllable.

4. The intubation assembly of claim 1, wherein the tracheal tube includes an inflatable cuff.

5. A tube adapter for an intubation assembly, the intubation assembly including a tracheal tube operable for insertion into a trachea of a patient, the tracheal tube including a proximal end and a distal end, the distal end being insertable into the trachea of the patient, the proximal end including a connector operable to couple to an air mover, the tube adapter comprising:
   a suction port operable to couple to a suction hose, the suction port configured to be fluidly coupled to the proximal end of the tracheal tube for removal of material from a region of the patient at or near to the distal end of the tracheal tube through the tracheal tube and the suction hose coupled to the suction port;
   a first opening operable to couple to the proximal end of the tracheal tube;
   a second opening operable to receive a stylet; and
   a cap provided on the second opening, the cap including the styllet so that the cap is joined with the styllet.

6. The tube adapter of claim 5, wherein removal of the cap from the second opening both A) provides a path for fluid flow that substantially prevents suction from the distal end to the suction port via application of a vacuum to the suction port and B) at least partially removes the styllet from the tracheal tube.

7. The tube adapter of claim 5, wherein the tube adapter is removable from the proximal end of the tracheal tube.

8. The tube adapter of claim 5, wherein suction from the distal end of the tracheal tube through the suction port is controllable.

9. A kit for performing intubation of a patient, the kit comprising:
   a tracheal tube operable for insertion into a trachea of the patient, the tracheal tube including a proximal end and a distal end, the distal end being insertable into the trachea of the patient, the proximal end including a connector operable to couple to an air mover;
   a tube adapter comprising:
      a suction port operable to couple to a suction hose, the suction port configured to be fluidly coupled to the proximal end of the tracheal tube for removal of material from a region of the patient at or near to the distal end of the tracheal tube through the tracheal tube and the suction hose coupled to the suction port;
      a first opening operable to couple to the proximal end of the tracheal tube; and
      a second opening operable to receive a stylet; and
      a cap provided on the second opening, the cap including the styllet so that the cap is joined with the styllet.

10. The kit of claim 9, wherein removal of the cap from the second opening both A) provides a path for fluid flow that substantially prevents suction from the distal end to the suction port via application of a vacuum to the suction port and B) at least partially removes the styllet from the tracheal tube.

* * * * *